3,067,090
FUNGICIDAL PREPARATIONS AND PROCESS FOR PREPARING THE SAME
Jan Bel, Groningen, Netherlands, assignor to Naamlooze Vennootschap: Aagrunol, Chemische Fabriek, Groningen, Netherlands
No Drawing. Filed Dec. 9, 1957, Ser. No. 701,674
Claims priority, application Netherlands Dec. 12, 1956
16 Claims. (Cl. 167—22)

The present invention relates to fungicidal preparations and to a process for their preparation, and more particularly to fungicidal preparations obtained by the oxidation of mixtures of alkylene bisdithiocarbamic acids or their salts with dithiocarbamic acids or their salts.

Heretofore, fungicidal preparations have been used which contained tetramethylthiuramdisulfide (TMTD). The fungicidal properties of tetramethylthiuramdisulfide are well known and have already been amply described in the literature (see Horsfall, "Fungicides and Their Action," pages 124–127). In this connection, tetramethylthiuramdisulfide gives good results when used to control Fusicladium in fruit-culture, but if the period between the first and second sprayings is too long, the fungicidal action rapidly decreases especially under the influence of certain weather conditions.

It has been discovered in accordance with the present invention that the reaction products obtained by the oxidation of a mixture of alkylene bisdithiocarbamic acids or salts of said acids with dithiocarbamic acids or salts of said acids exhibit exceptional fungicidal properties, and are free from the above mentioned disadvantages of tetramethylthiuramdisulfide.

The salts of both of these starting products which may be used in accordance with the process of the present invention may be readily obtained by treatment of the monoamine or diamine with carbodisulfide in the presence of a base such as sodium hydroxide.

The appropriate acids are made from the respective salts by acidification with inorganic acids e.g. hydrochloric acid.

The monoamines which may be used in accordance with the process of the present invention include among others dimethylamine, diethylamine pyrrolidine, morpholine, while the diamines which may be used include among others ethylenediamine, hexamethylenediamine.

The dithiocarbamic acid salts may be prepared generally by reacting 1 mol of carbon disulfide with 1 mol of monoamine such as dimethylamine and 1 mol of sodium hydroxide in aqueous solution.

A temperature within the range of 20–50° may be used for the reaction, but a temperature of 35–40° is preferred.

The reaction requires 1 hour for completion and a yield of about 98% of the theoretical is obtained.

Similarly the alkylene bisdithiocarbamic acid salts may be prepared generally by reacting 2 mols of carbon disulfide with 1 mol of diamine such as ethylenediamine and 2 mols of sodium hydroxide in aqueous solution.

A temperature within the range of 20–50° may be used for the reaction, but a temperature of 35–40° is preferred.

The reaction requires about 1½ hours for completion and a yield of about 95% of the theoretical is obtained.

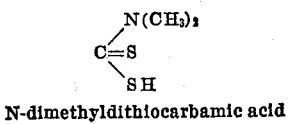

N-dimethyldithiocarbamic acid

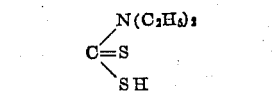

N-diethyldithiocarbamic acid

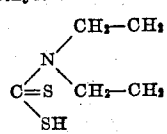

N-pyrrolidyldithiocarbamic acid

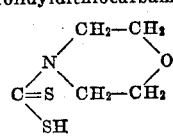

N-morpholyldithiocarbamic acid

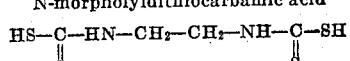

Ethylenebisdithiocarbamic acid

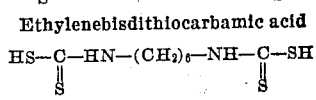

Hexamethylenebisdithiocarbamic acid

The dithiocarbamic acid salts and the alkylenebisdithiocarbamic acid salts are readily converted into their respective acids by reaction with an equimolar quantity of inorganic acids e.g. hydrochloric acid in aqueous solution.

The dithiocarbamic acids or their salts obtained in the manner set forth hereinabove are mixed with the alkylene bisdithiocarbamic acids or their salts similarly obtained as hereinabove described, whereafter the mixture of acids or salts is oxidized by any suitable oxidizing agent such as ammonium persulfate.

EXAMPLE I

To a solution of 0.5 gram-molecule of sodium diethyldithiocarbamate, obtained from 38 gms. of carbondisulfide (0.5 gram-molecule), 36.5 gms. of diethylamine (0.5 gram-molecule) and 60.5 gms. of 33% aqueous sodium hydroxide solution (0.5 gram-molecule), and 91 gms. of crystallized sodiumethylenebisdithiocarbamate (0.25 gram-molecule) in 800 ml. of water, is added while stirring a solution of 114 gms. of ammonium persulfate in 600 ml. of water.

111 gms. of an insoluble, pale yellow oxidation product are separated.

EXAMPLE II

To a solution of 0.5 gram-molecule of sodium N-pyrrolidyldithiocarbamate, obtained from 38 gms. of carbon disulfide (0.5 gram-molecule), 35.5 gms. of pyrrolidine (0.5 gram-molecule) and 60.5 gms. of 33% aqueous sodium hydroxide solution (0.5 gram-molecule), and 91 gms. of crystallized sodium ethylene bisdithiocarbamate (0.25 gram-molecule) in 800 ml. of water, is added while stirring a solution of 114 gms. of ammoniumpersulfate in 600 ml. of water.

110 gms. of an insoluble yellow oxidation product are separated.

EXAMPLE III

To a solution of 0.5 gram-molecule of sodium N-morpholyldithiocarbamate, obtained from 38 gms. of carbondisulfide (0.5 gram-molecule), 43.5 gms. of morpholine (0.5 gram-molecule) and 60.5 gms. of 33% aqueous sodium hydroxide (0.5 gram-molecule) and 91 gms. of crystallized sodium ethylenebisdithiocarbamate (0.25 gram-molecule), in 800 ml. of water, is added while stirring a solution of 114 gms. of ammoniumpersulfate in 600 ml. of water.

83 gms. of an insoluble yellow oxidation product are separated.

EXAMPLE IV

To a solution of 0.5 gram-molecule of sodium N-pyrrolidyldithiocarbamate, obtained from 38 gms. of carbondisulfide (0.5 gram-molecule), 35.5 gms. of pyrollidine (0.5 gram-molecule) and 60.5 gms. of 33% aqueous sodium hydroxide (0.5 gram-molecule), and 0.25 gm. gram-molecule of sodium hexamethylenebisdithiocarbamate, obtained from 39 gms. of hexamethylenediamine (0.25 gram-molecule), 38 gms. of carbondisulfide (0.5 gram-molecule) and 60.5 gms. of 33% aqueous sodium-hydroxide (0.5 gram-molecule), in 500 ml. of water, is added while stirring a solution of 114 gms. of ammoniumpersulfate in 400 ml. of water.

115 gms. of a white insoluble reaction product are separated.

The temperature which may be used in accordance with the process of the present invention for the reaction of the dithiocarbamic acids and salts, the alkylene bisdithiocarbamid acids and salts and the oxidising agent is within the broad range of 0–50°, but a temperature within the range of 15–30° is preferred.

It is surprising that when a solution of one gram-molecule of the sodium salt of ethylene bisdithiocarbamic acid and a solution of two gram-molecules of the sodium salt of dimethyl dithiocarbamic acid are reacted, in the presence of ammonium persulfate, the reaction product contains no tetramethylthiuramdisulfide in determinable amounts.

It is still more surprising that the reaction products obtained in accordance with the process of the present invention are generally favorably distinguished from tetramethylthiuramidisulfide in fungicidal activity as will appear hereinafter in greater detail.

According to the present invention the reaction products thus obtained may be advantageously admixed with suitable conventional fillers to which, if desired, one or more binders, wetting agents, emulsifiers and dispersing agents may be added. The aforementioned fillers or solvents serve as inert carriers for the reaction products of the present invention.

Some specific fillers that can be used in the preparation of the fungicidal products are a.o.: clay, diatomaceous earth, kaolin, precipitated chalk.

Specific binders a.o.: polyvinylpyrrolidone, carboxymethylcellulose, tylose.

Specific wetting agents a.o.: dibutylnaphthalenesulphonate, dodecylbenzenesulphonate.

Specific emulsifiers a.o.: polyoxyethylene glycolethers or esters.

Specific dispersing agents a.o.: sulphite lye powder, methanedinaphthalenesulphonate.

Furthermore, any aliphatic diamine and any monoamine may be used as the respective starting products in accordance with the process of the present invention, and the relative proportions of such diamines and monoamines may be varied so that reaction products of varying composition may be obtained accordingly.

The relative merits of the reaction products produced in accordance with the present invention as fungicides have been compared with those attributable to the conventionally used compound, tetramethylthiuramdisulfide. Tests have shown conclusively that under identical experimental conditions a better control of scab is brought about with the reaction products of the present invention than with tetramethylthiuramdisulfide. A comparison in this regard clearly showing the superior action of the reaction products of the present invention is set forth below in Example VII, Test B. Moreover, when a quantity of such reaction product is added to tetramethylthiuramdisulfide, the scab controlling action of the combined ingredients is a considerable improvement over that of tetramethylthiuramdisulfide alone as is strikingly shown in Example VII.

The following examples are set forth for the purpose of illustration only, and it is to be understood that the present invention is not to be limited thereby. The parts used are parts by weight unless specifically otherwise stated.

EXAMPLE V 72.8 gms. of crystallized sodium ethylene bisdithiocarbomate (⅙ gram-molecule) and 71.6 gms. of crystallized sodium dimethyl dithiocarbamate (⅖ gram-molecule) are dissolved in 450 ml. of water. While stirring, a solution of 91.0 gms. of ammonium persulfate in 540 ml. of water is added thereto by means of a dropping funnel. 65 gms. of an insoluble, pale yellow oxidation product are separated.

The fungicidal activity of the reaction product is tested according to the "slide germination method of evaluating fungicides" (Phytopathology 33, pages 627 to 632), with regard to fungus Clasterosporium. The $LD_{50}$ appears to be 1.5 parts per million. For tetramethylthiuramdisulfide a $LD_{50}$ of 4 parts per million is found according to this method.

EXAMPLE VI

A fungicidal preparation G was formulated by mixing and grinding 80 parts of the reaction product prepared according to Example I with 20 parts consisting of both a dispersing agent (a modified sulphite lye powder) and a wetting agent (dibutylnaphthalenesulphonate). This preparation was compared with a preparation T, which had been prepared in the same way with 80% of tetramethylthiuramdisulfide, in a test for controlling *Venturia inaequalis* (apple scab) on leaves of the James Grieve variety.

About 26 hours after spraying the respective test leaves with one or the other of the above preparations for a one-half hour period, inoculation was executed over a 15 minute period with spores, derived principally from the leaves of the James Grieve variety. A concentration of 200,000 spores per $cm.^3$ was used. 10 $cm.^3$ was used for each shoot.

The following results were found upon examination of the test leaves approximately 26 days after inoculation.

| | Number of scab spots on the leaf |
|---|---|
| Preparation G sprayed in a concentration of 0.2% | 0. |
| Preparation T, sprayed in a concentration of 0.2% | 20. |
| Non-treated control | Spots merge, about 50% of the leaf area was affected. |

EXAMPLE VII

A fungicidal preparation TG was formulated from the reaction product prepared according to Example I and tetramethylthiuramdisulfide by mixing and grinding 15 parts of said reaction product, 65 parts of tetramethylthiuramdisulfide and 20 parts consisting of the dispersing agent and wetting agent, used in Example VI. The preparation TG was compared in 2 tests with the preparation T (Example II), containing 80% of tetramethylthiuramdisulfide and prepared in the same way as mentioned above.

*Test A.—Preventive Scab Test on the James Grieve Variety*

Spraying with the above agents TG and T was performed for a duration of 1¼ hours. After about 72 hours, inoculation was performed over a similar 1¼ hour period. The suspension of spores originated from various apple varieties.

A density of 100,000 spores per $cm.^3$ was obtained. 10 $cm.^3$ per shoot was used. The germination on an object slide was, after 24 hours, about 90%.

The following results were observed upon examination of the test leaves approximately 15 days after inoculation.

| | Number of scab spots on the leaf |
|---|---|
| Preparation of TG in a concentration of 0.25% | 0. |
| Preparation T in a concentration of 0.25% | About 14% of the leaf area was affected. |
| Non-treated control | Spots merge, about 50% of the leaf area was affected. |

*Test B.—Scab Test on the Pear Variety Beurré Hardy*

Spraying with the above agents TG and T, both in 0.2% concentration was successively performed on the 10th, 21st, 33rd, 47th and 78th days after the initial spraying.

| | Percentage of fruit affected by scab (*Venturia pirina*) |
|---|---|
| Preparation TG | 39.9 |
| Preparation T | 57.6 |
| Non-treated control | 99.3 |

EXAMPLE VIII

Oxidation of a solution of 72.8 gms. of sodium ethylenebisdithiocarbamate (0.2 gram-molecule) and 35.8 gms. of sodiumdimethyldithiocarbamate (0.2 gram-molecule) in 350 ml. of water, gave a yield of 42 gms. of light yellow material. $LD_{50}$ with regard to clasterosporium: 4 parts per million.

EXAMPLE IX

Oxidation of a solution of 72.8 gms. of sodium ethylenebisdithiocarbamate (0.2 gram-molecule) and 23.9 gms. of sodiumdimethyldithiocarbamate (0.133 gram-molecule) in 300 ml. of water gave a yield of 41 gms. of yellow material. $LD_{50}$ with regard to clasterosporium: 3 parts per million.

EXAMPLE X

Oxidation of a solution of 72.8 gms. of sodium ethylenebisdithiocarbamate (0.2 gram-molecule) and 17.9 gms. of sodiumdimethyldithiocarbamate (0.1 gram-molecule) in 270 ml. of water gave a yield of 40 gms. of yellow material. $LD_{50}$ with regard to clasterosporium: 5 parts per million.

EXAMPLE XI

Oxidation of a solution of 72.8 gms. of sodium ethylene bisdithiocarbamate (0.2 gram-molecule) and 14.3 gms. of sodiumdimethyldithiocarbamate (0.08 gram-molecule) in 250 ml. of water gave a yield of 46 gms. of yellow material. $LD_{50}$ with regard to elasterosporium: 2.5 parts per million.

The invention relates to the oxidation of mixtures of alkylenebisdithiocarbamic acids or salts and the dithiocarbamic acids or their salts in proportions between ½:1 and 2½:1.

While the foregoing description and examples are directed to the preferred embodiment, it will be readily apparent that various substitutions and modifications may be made without departing from the spirit and scope of the present invention which is to be limited only by the scope of the appended claims.

What is claimed is:

1. A process for the manufacture of fungicidal preparations which comprises reacting in aqueous solution 1 mol of a compound selected from the group consisting of (*a*): ethylene- and hexamethylene-bisdithiocarbamic acids and the sodium salts thereof with 2 mols of a compound selected from the group consisting of (*b*): N-dimethyl, N-diethyl, N-pyrrolidyl and N-morpholinyl-dithiocarbamic acids and the sodium salts thereof, in the presence of ammonium persulfate.

2. Process in accordance with claim 1, wherein compound (*a*) is the sodium salt of ethylene-bisdithiocarbamic acid and compound (*b*) is the sodium salt dimethyldithiocarbamic acid.

3. Process in accordance with claim 1, wherein compound (*a*) is the sodium salt of ethylene bis-dithiocarbamic acid and compound (*b*) is the sodium salt of diethyl dithiocarbamic acid.

4. Process in accordance with claim 1, wherein compound (*a*) is the sodium salt of ethylene bis-dithiocarbamic acid and compound (*b*) is the sodium salt of N-pyrrolidyl dithiocarbamic acid.

5. Process in accordance with claim 1, wherein compound (*a*) is the sodium salt of ethylene bis-dithiocarbamic acid and compound (*b*) is the sodium salt of N-morpholinyl dithiocarbamic acid.

6. Process in accordance with claim 1, wherein compound (*a*) is the sodium salt of hexamethylene bis-dithiocarbamic acid and compound (*b*) is N-morpholinyl dithiocarbamic acid.

7. A process for the manufacture of fungicidal preparations which comprises reacting in aqueous solution one molar equivalent of ethylene bis-dithiocarbamic acid and two molar equivalents of N-dimethyl dithiocarbamic acid in the presence of ammonium persulfate.

8. A fungicidal preparation made in accordance with the process of claim 1.

9. A fungicidal preparation made in accordance with claim 1 and including at least one other fungicide.

10. A fungicidal preparation made in accordance with claim 1 and including tetra-methyl-thiuram-disulfide.

11. A reaction product made in accordance with the process of claim 2.

12. A reaction product made in accordance with the process of claim 3.

13. A reaction product made in accordance with the process of claim 4.

14. A reaction product made in accordance with the process of claim 5.

15. A reaction product made in accordance with the process of claim 6.

16. A reaction product made in accordance with the process of claim 7.

References Cited in the file of this patent

UNITED STATES PATENTS

| 2,751,416 | Nadler et al. | June 19, 1956 |
| 2,766,274 | Flenner | Oct. 9, 1956 |